Dec. 7, 1954   H. A. WILKINSON ET AL   2,696,291
FEED MECHANISM
Filed Aug. 23, 1949   5 Sheets-Sheet 3

INVENTORS
H. A. WILKINSON
A. H. HARRIS
G. H. CARTER

INVENTORS
H. A. WILKINSON,
A. H. HARRIS &
BY  G. H. CARTER

Wilkinson & Mawhinney
Attorneys

United States Patent Office 2,696,291
Patented Dec. 7, 1954

2,696,291

FEED MECHANISM

Horace Allan Wilkinson, Moor Park, Farnham, Arthur Harold Harris, Dorking, and George Harold Carter, Redhill, England, assignors to Carter Wilkinson Limited, Redhill, England, a British company Application August 23, 1949, Serial No. 111,904

Claims priority, application Great Britain October 27, 1948

5 Claims. (Cl. 198—218)

This invention comprises improvements in or relating to feed mechanism for feeding pallets and like articles in a row along a guideway.

In the manufacture of roofing and other tiles, slabs and the like from plastic material, particularly a cement mix, machines are known of the type (hereinafter referred to as the type described) in which the plastic material is entrained or fed from the bottom of a hopper on to pallets which are fed by feed mechanism in a row along a guideway past the hopper so as to cause a layer of the plastic material to be deposited on the pallets, which layer is subsequently cut in the machine by a cutting device to form slabs or the like, hereinafter referred to generally as tiles. In such known machines the pallets have been advanced in a line by a belt conveyor towards intermittently actuating, reciprocatory feed mechanism in such a manner that an idle period during which the tiles remained at rest on the guideway was reduced so as to be shorter than the feed movement.

These tile-making machines have proved very satisfactory in practice, but it is sometimes desirable to speed up the operation of the machine, and feed the pallets to the hopper in a substantially continuously moving row, thereby substantially eliminating the said idle period, and an important object of the present invention is to provide an improved construction of feed mechanism which shall enable that end to be attained.

According to the present invention there is provided feed mechanism to feed pallets and like articles in a row along a guideway and comprising two reciprocatory feeder devices each having a feeder member, which feeder members are situated one behind the other in the direction of movement of the articles, and actuating means for operating the feeder devices and imparting an operative stroke to each feeder member in turn while the other feeder member is making its idle or return stroke, the feeder members being arranged to operate alternately on the articles in the row to feed the articles along the guideway.

Preferably the actuating means provides a quick-return motion for each feeder member and in a practical construction of the feed mechanism the actuating means comprises for each feeder member a quick-return device of the kind consisting of a lever arranged for oscillation about an axis transverse to its length and a crank (e. g. in the form of a crank disc) rotatable about a second axis extending in a direction parallel to that of the lever, the crank pin being arranged to make, during rotation of the crank, sliding engagement with the lever in the lengthwise direction thereof and also to effect oscillation of the lever at angular velocity which is greater in one direction (i. e. when the crank pin is near to the pivotal axis of the lever) than it is in the other direction (i. e. when the crank pin is remote from the pivotal axis of the lever), the associated article-engaging feeder member being operatively connected to the lever at a position remote from the pivotal axis thereof.

Conveniently, the two cranks are arranged to be rotated in the same direction at 180° out of phase by a member, such as a gear wheel, common to them both.

The article-engaging feeder members may each comprise a slider that is aranged to slide on a pair of slide bars, carries at least one pivoted pawl at one end, and has its other end pivotally connected by a link to the slotted lever 8.

The invention also provides a machine for use in making tiles comprising; a longitudinal frame having a guideway; feed mechanism operative at a position intermediate between the ends of the guideway to push a continuous stream of bare pallets along one portion of the guideway to a station at which tile forming material is deposited on the pallets and comprising two reciprocatory feeder devices each device having a feeder member, which feeder members are situated one behind the other in the direction of movement of the pallets and actuating means for operating the feeder devices and imparting an operative stroke to each feeder member in turn while the other feeder member is making its idle or return stroke; conveyor means of the endless member type mounted on the frame for advancing pallets in a row along the guideway to the feed mechanism; and driving means for operating in unison the conveyor means and the actuating means for the feeder devices.

In the preferred construction of the machine at least a portion of the conveyor means operates at a slightly higher conveying speed than does the feeding means so that the pallets are crowded up to the feeding means.

One embodiment of the invention will now be described by way of example, and not by way of limitation, with reference to the accompanying drawings showing a feed mechanism for a machine for the manufacture of moulded tiles from plastic material constituted by cement mix carried through a moulding aperture by means of conveyor means of the endless member type to form a continuous moulded length or ribbon which is then cut into lengths on the machine. In said drawings.

Like reference characters designate like parts throughout the several views.

Figure 1:
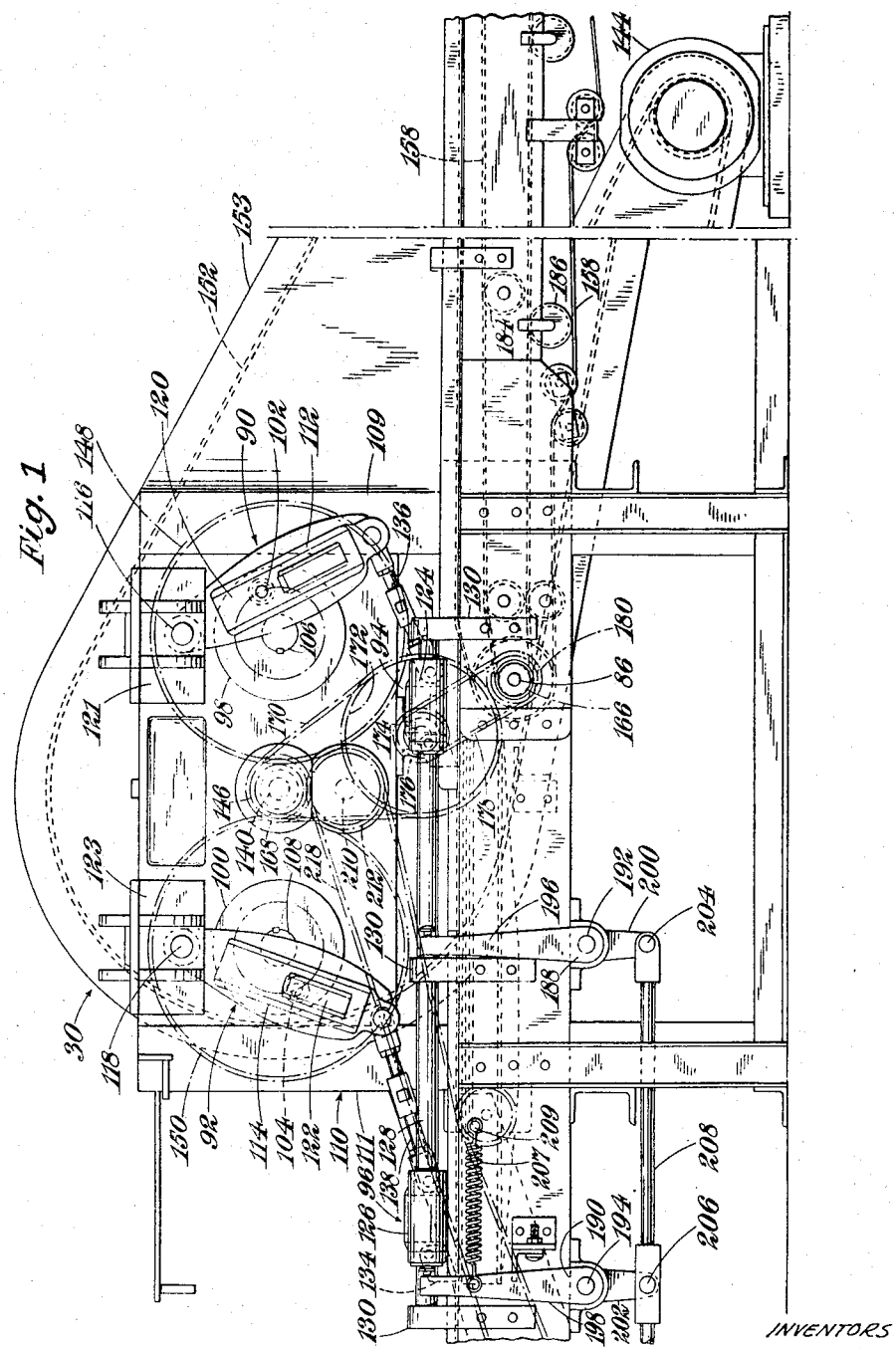
Figure 1 is a side elevation of feed mechanism for pallets.

As shown in the drawings, the machine comprises a longitudinal framing which supports conveyor means comprising an endless belt conveyor 26 and a pallet feed mechanism designated generally 30. The endless belt conveyor 26 has front end pulleys on a suitable shaft (not shown) at the front end of the conveyor and rear end pulleys 84 on a shaft 86 are situated adjacent to and below the feed mechanism 30.

The conveyor 26 is for conveying pallets on which tiles are to be formed and constitutes a crowding conveyor. This crowding conveyor is run at a slightly faster conveying speed than the feed mechanism 30, and the bare pallets are crowded together on it in a solid stream and delivered to the feed mechanism 30. This mechanism 30 advances the pallets in a continuous row along a guideway on the framing to pass underneath the outlet of the hopper for cement mix (not shown), whereby the pallets are covered by a continuous ribbon of the mix. The pallets covered by the ribbon then pass to cutting, punching and surfacing devices (not shown).

Figure 2:
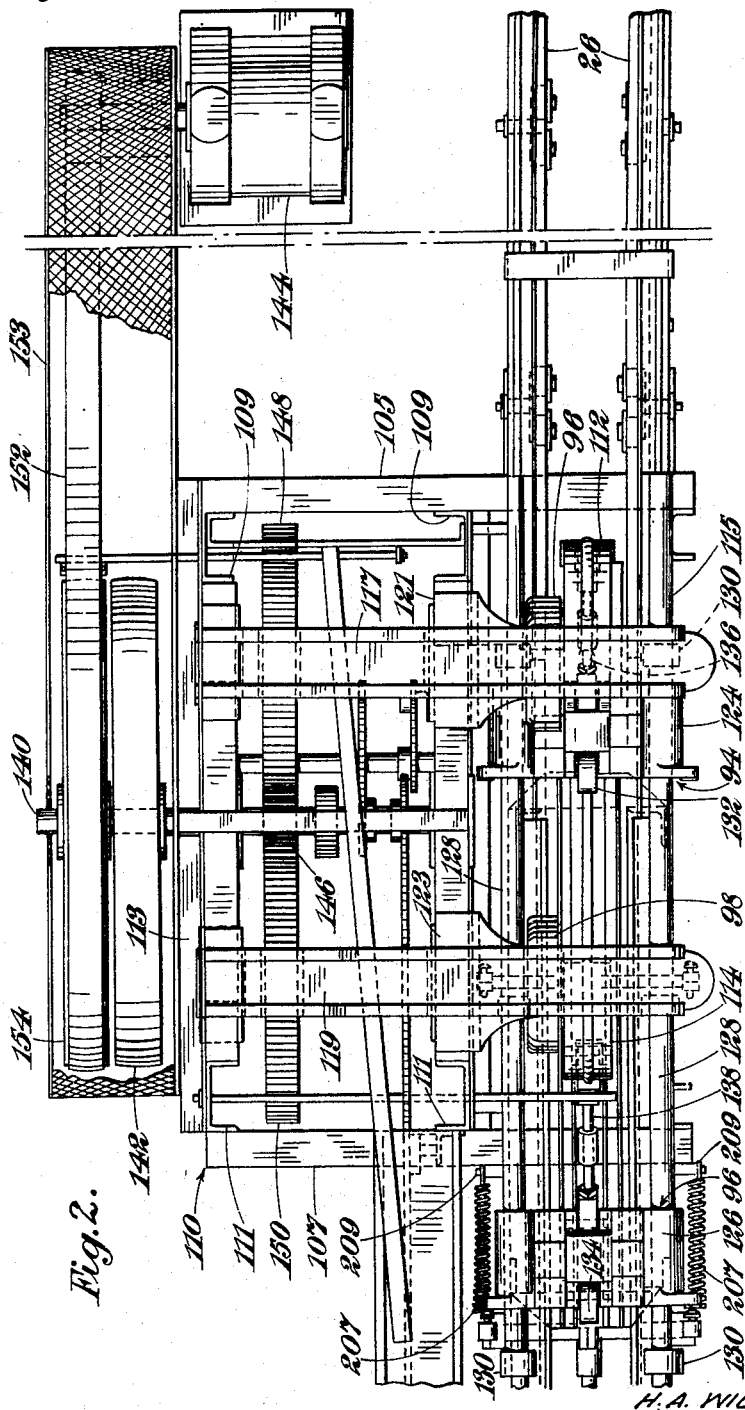
Figure 2 is a plan view thereof.
Figure 3:
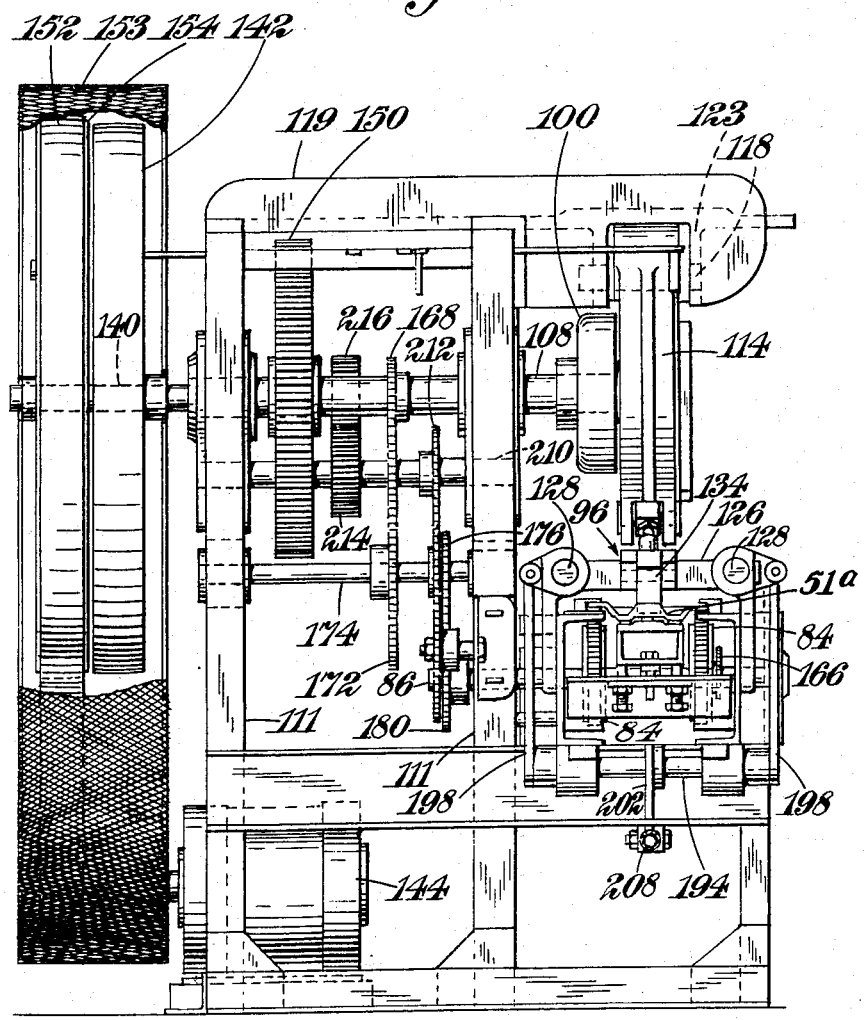
Figure 3 is an end elevation thereof.
Figure 4:
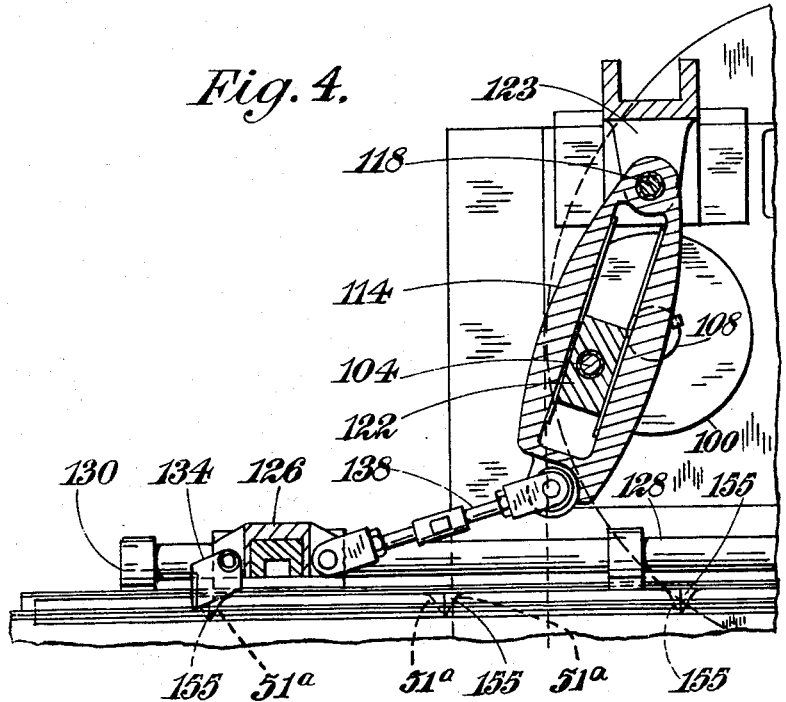
Figure 4 is a detail sectional elevation of a feed device of the feed mechanism shown in Figures 5, 6 and 7.

The feed mechanism 30 shown most clearly in Figures 1, 2 and 3 for feeding a row of pallets along a guideway on the framing 18 comprises two reciprocatory feeder devices designated respectively 90 and 92, each having a pallet-engaging device 94 and 96, respectively, situated one behind another in the direction of length of the framing 18 and consequently in the direction of movement of the pallets on it which is from right to left as seen in Figures 1, 2 and 4. Actuating means for operating the feeder devices 90 and 92 and imparting an operative stroke to one pallet-engaging device, while the other is making its idle or return stroke, comprises two disc-cranks 98 and 100, having crank pins 102 and 104 respectively, rotatable in unison about the longitudinal axes of shafts 106 and 108 journalled in a frame designated generally 110. This frame comprises two pairs of vertical end supports 109 and 111, horizontal longitudinal members 113 and 115 at the top thereof, transverse members 105 and 107, and transverse bearer members 117 and 119 which are carried by the members 113 and 115, and carry at their underside two bearing brackets 121 and 123. Two oscillatory slotted arms 112 and 114 are respectively pivoted at 116 and 118 above the shafts 106 and 108 on the bearing brackets 121 and 123 respectively, and thus extend transversely of the direction of movement of the pallets. Two slide members 120 and 122, each in the form of a block, are slidable respectively along the arms 112 and 114 in their slots, and are engaged each by one of the crank-pins 102 and 104. The two pallet-engaging devices 94 and 96 respectively comprise a slider 124 and 126, both slidable along a pair of parallel bars 128 carried by vertical supports 130 fixed in spaced relation one from another on the framing 18. Each of these sliders constitutes a saddle movable on, and extending between the parallel bars, and respectively carries at its end nearer the hopper 32 one pivoted pawl 132 and 134. In some cases two such pawls may be provided on each saddle. The other ends of the sliders are respectively pivotally connected by adjustable links 136 and 138 to the slotted arms 112 and 114.

The disc-cranks 98 and 100 may be driven in the same direction in any convenient manner. As illustrated, a drive shaft 140 carrying a pulley 142 belt-driven by an electric motor 144 drives the two disc-cranks 98, 100 in the same direction by gearing comprising a pinion 146 on the shaft 140 meshing with two spur gear wheels 148, 150 fixed respectively on the shafts 106 and 108 which carry the disc-cranks 98, 100. When the belt 152 in a guard 153 is shifted from the loose pulley 154 to the pulley 142 the feed mechanism 92 is driven, the sliders or saddles 94, 96 are reciprocated on the parallel bars 128 in such a manner that when the pawl 132 on the saddle 94 is feeding a pallet forwards, the pawl 134 on the saddle 126 is making an idle return stroke, and engages at the rear of the pallet just fed forwards by the pawl 132 and feeds it further forwards. During this feed movement of the pawl 134 the pawl 132 is making its idle return stroke and engages behind the rear end of the next oncoming pallet, so that a continuous stream of pallets is fed forwards from the feeding mechanism 30 along the guideway on the framing. In Figure 4, pallets 51 are shown abutting one another at 155.

Referring more particularly to Figure 4, and also to Figure 2, it is to be noted that the pallets 51 have curved longitudinal end portions 51ª which, when the pallets are placed end to end in a lengthwise direction, form the notch 155 into which the pawls 134 seat and engage. This is shown in Figures 4 and 7.

Figure 5:
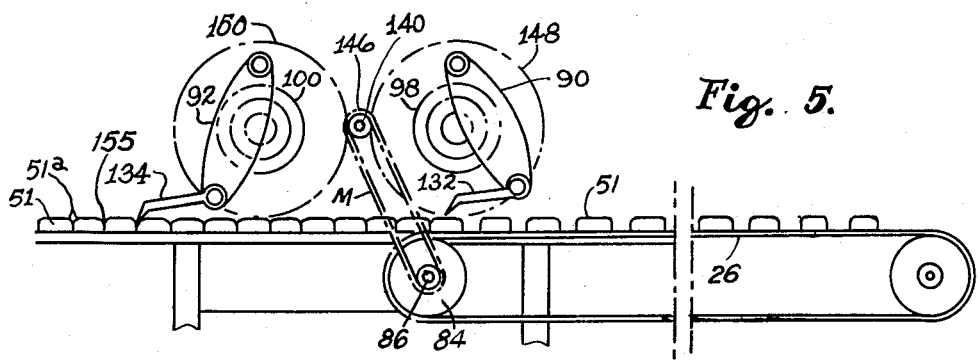
Figure 5 is a schematic side elevational view of the device shown in Figure 1 in the position illustrated therein.
Figure 6:
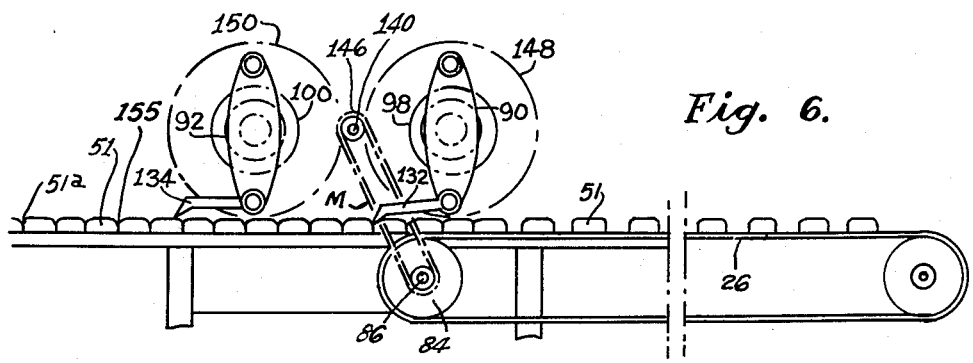
Figure 6 is a schematic view similar to Figure 5 showing the feeder pawls in one of the steps of its sequential operation.
Figure 7:
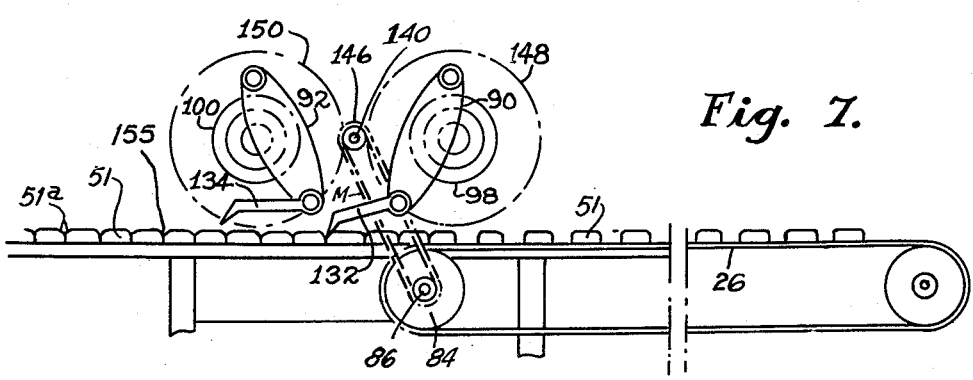
Figure 7 is a view similar to Figure 6 showing the feeder pawls in a further position of its sequential operation.

Referring more particularly to Figures 5 through 7, inclusive, it will be seen that the pallets 51 are fed by a conveyor 26 and that the feeder pawls 134 and 132 are shown in the position wherein the pawl 134 is completing a pusher step of operation wherein the pawl 134 is urging the pallets 51 toward the left hand side of Figure 5. The pawl 132 is in its returned stroke position wherein it is not in contact and not feeding any pallets. In Figure 6 the pawl 134 is on its return stroke and is sliding rearwardly over a line of pallets 51 while the pawl 132 is in an engaging position with the pallets 51 preparatory to feeding these pallets toward the left hand end of Figure 5 where they will subsequently be engaged by the pawl 134. In Figure 7, the pawl 134 is shown in its retracted condition similar to the pawl 132 in Figure 5 wherein it is not in contact with any pallets. In this figure the pawl 132 is engaged within the notch 155 defined between the curved ends 51ª of the pallets 51 and occupy a position similar to the position of the feeding pawl 134 in Figure 5 thereby advancing a line of pallets to the left of Figure 7.

The conveyor and feeder devices are actuated by a common prime mover, the two feeder devices being given reciprocatory movements over the row of pallets 51 in out of phase relation. The mechanism insures that there will be a continual moving row of pallets from the two feeder devices.

In Figures 5, 6 and 7, *m* designates a transmission mechanism represented as an endless chain for transmitting a drive from the shaft 140 to the shaft 86. This mechanism is shown more in detail in Figures 1, 2, and 3 as comprising a driving pinion 168 that is fast on the drive shaft 140 and is geared by a chain 170 with a sprocket wheel 172 which is fast on a shaft 174 which carries a sprocket pinion 176 which, in turn, is geared by a chain 178 with a sprocket-wheel 180 mounted on the shaft 86.

The parts shown at 188 to 203 inclusive in Figures 1 and 3 are for actuating the cutting, punching and surfacing devices hereinbefore referred to but not shown in the drawings.

The bare pallets pass on to the crowding conveyor 26, on which they advance crowded together in a solid stream to the feed mechanism 30. This ensures that the positive propelling feed mechanism described above shall always have pallets to be engaged by the pawls 132 and 134 on the sliders or saddles 94 and 96, and shall not be "starved."

The described feed mechanism is particularly adapted for machines for the manufacture of roofing tiles known in the trade as interlocking tiles, and it will be appreciated that the improved feed mechanism enables such tiles to be manufactured rapidly in succession in a continuous row with a minimum of manual labour.

We claim:

1. Feed mechanism for advancing a row of articles comprising a guideway along which the row is to be advanced, two reciprocatory feeder devices each having a feeder member, which feeder members are situated one behind the other in the direction of movement of the articles along the guideway, actuating means for operating the feeder devices and imparting an operative stroke to each feeder member in turn while the other feeder member is making its idle or return stroke so that the feeder members are operative in turn on the articles in the row to feed the articles along the guideway, conveyor means behind the feeder members in the direction of movement of the row and means for driving the conveyor means at a higher conveying speed than the feeder devices to cause the articles to be crowded up to the feeder devices.

2. Feed mechanism as claimed in claim 1 in which the actuating means comprises for each feeder member a quick-return device of the kind consisting of a lever arranged for oscillation about an axis transverse to its length and a crank rotatable about a second axis extending in a direction parallel to the axis of oscillation of the lever, the crank pin being arranged to make, during rotation of the crank, sliding engagement with the lever in the lengthwise direction thereof and also to effect oscillation of the lever at an angular velocity which is greater in one direction (i. e. when the crank pin is near to the pivotal axis of the lever) than it is in the other direction (i. e. when the crank pin is remote from the pivotal axis of the lever) and in which the associated article-engaging feeder-member is operatively connected to the lever at a position remote from the pivotal axis thereof.

3. Feed mechanism as claimed in claim 2 in which the two cranks are arranged to be rotated in the same direction at 180° out-of-phase by a member common to both.

4. Feed mechanism as claimed in claim 2 wherein each feeder member comprises a slider that is arranged to slide on a pair of slide bars, that carries a pivoted pawl at one end and that has its other end pivotally connected by a link to the allotted lever.

5. A machine for making tiles by depositing tile-forming material on to a continuous succession of bare pallets fed to a station at which the material is deposited, which machine comprises a longitudinal frame having a guideway; feed mechanism operative at a position intermediate between the ends of the guideway to push a continuous stream of bare pallets along one portion of the guideway to the station at which tile forming material is deposited on the pallets and comprising two reciprocatory feeder devices each device having a feeder member, which feeder members are situated one behind the other in the direction of movement of the pallets and actuating means for operating the feeder devices and imparting an operative stroke to each feeder member in turn while the other feeder member is making its idle or return stroke; conveyor means of the endless member type mounted on the frame for advancing pallets in a row along the guideway to the feed mechanism; and driving means for operating in unison the conveyor means and the actuating means for the feeder devices, said driving means being effective to drive said conveyor means at a higher conveying speed than said feed mechanism to cause said pallets to be crowded up to said feeder mechanism.

References Cited in the file of this patent

UNITED STATES PATENTS

| Number | Name | Date |
|---|---|---|
| 875,879 | Zeigler | Jan. 7, 1908 |
| 1,440,288 | Gray | Dec. 26, 1922 |
| 1,560,373 | Birnstock | Nov. 3, 1925 |
| 1,619,489 | Schwarz et al. | Mar. 1, 1927 |
| 1,680,996 | Kitchel et al. | Aug. 14, 1928 |
| 1,715,204 | Lorenz | May 28, 1929 |
| 1,726,418 | Aldrich et al. | Aug. 27, 1929 |
| 1,811,412 | Whitacre | June 23, 1931 |
| 2,258,553 | Hartley | Oct. 7, 1941 |
| 2,380,910 | Newton | July 31, 1945 |
| 2,495,960 | George | Jan. 31, 1950 |
| 2,525,189 | Thomas | Oct. 10, 1950 |
| 2,620,060 | Bird | Dec. 2, 1952 |